(12) United States Patent
Han et al.

(10) Patent No.: US 9,959,670 B2
(45) Date of Patent: May 1, 2018

(54) METHOD FOR RENDERING TERRAIN

(71) Applicant: KOREA UNIVERSITY RESEARCH AND BUSINESS FOUNDATION, Seoul (KR)

(72) Inventors: Jung-Hyun Han, Seoul (KR); Hyeong Yeop Kang, Seoul (KR); Han Young Jang, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 110 days.

(21) Appl. No.: 15/116,812

(22) PCT Filed: Mar. 25, 2014

(86) PCT No.: PCT/KR2014/002497
§ 371 (c)(1),
(2) Date: Aug. 4, 2016

(87) PCT Pub. No.: WO2015/119325
PCT Pub. Date: Aug. 13, 2015

(65) Prior Publication Data
US 2017/0116780 A1  Apr. 27, 2017

(30) Foreign Application Priority Data
Feb. 7, 2014 (KR) .................. 10-2014-0014101

(51) Int. Cl.
*G06T 15/30* (2011.01)
*G06T 17/20* (2006.01)
(Continued)

(52) U.S. Cl.
CPC ............... *G06T 17/20* (2013.01); *G06T 1/20* (2013.01); *G06T 17/005* (2013.01); *G06T 17/05* (2013.01)

(58) Field of Classification Search
CPC ......... G06T 17/20; G06T 1/20; G06T 17/005; G06T 17/05
See application file for complete search history.

(56) References Cited

U.S. PATENT DOCUMENTS 5,990,896 A * 11/1999 Barrus .................... G06T 15/10
345/420
6,108,006 A * 8/2000 Hoppe .................... G06T 17/20
345/420
(Continued)

FOREIGN PATENT DOCUMENTS

| KR | 100935886 B1 | 1/2010 |
| KR | 101129084 B1 | 3/2012 |
| WO | 00/19380 A1 | 4/2000 |

OTHER PUBLICATIONS

"GPU-based Adaptive LOD control for Quadtree-Based Terrain Rendering", INHA Graduate School, Feb. 2009, 34 pages.
(Continued)

Primary Examiner — Devona Faulk
Assistant Examiner — Charles L Beard
(74) Attorney, Agent, or Firm — Hauptman Ham, LLP

(57) ABSTRACT

The present invention relates to a method for rendering a multi-resolution terrain using GPU tessellation.

A method for rendering a terrain using GPU tessellation according to an embodiment of the present invention may include: generating a quad patch to which an inner tessellation factor and an edge tessellation factor are allocated by using a quadtree including a parent node and child nodes; generating a base mesh b using the quad patch; and restoring a terrain by applying a displacement map to the base mesh.

12 Claims, 18 Drawing Sheets

(51) Int. Cl.
*G06T 17/05* (2011.01)
*G06T 17/00* (2006.01)
*G06T 1/20* (2006.01)

(56) References Cited

U.S. PATENT DOCUMENTS

| | | | | |
|---|---|---|---|---|
| 6,137,492 A * | 10/2000 | Hoppe | G06T 17/20 | 345/418 |
| 6,889,176 B1 * | 5/2005 | Buttolo | G06T 17/20 | 345/420 |
| 6,940,505 B1 * | 9/2005 | Savine | G06T 17/20 | 345/419 |
| 7,239,311 B2 * | 7/2007 | Dunn | G06T 17/05 | 345/419 |
| 7,561,156 B2 * | 7/2009 | Levanon | G06T 17/005 | 345/419 |
| 7,564,455 B2 * | 7/2009 | Gatewood, Jr. | G06T 19/00 | 345/419 |
| 7,948,489 B1 * | 5/2011 | Barnes | G06T 17/20 | 345/419 |
| 8,217,936 B1 * | 7/2012 | Barnes | G06T 17/20 | 345/419 |
| 8,482,560 B2 * | 7/2013 | Sathe | G06T 17/20 | 345/419 |
| 8,537,158 B2 * | 9/2013 | Gong | G06T 17/20 | 345/419 |
| 8,762,493 B1 * | 6/2014 | Kirmse | G06F 17/30241 | 382/305 |
| 8,886,445 B1 * | 11/2014 | Skoog | G08G 5/04 | 345/606 |
| 8,976,169 B1 * | 3/2015 | Barreirinhas | G06T 15/04 | 345/419 |
| 9,082,204 B2 * | 7/2015 | Goel | G06T 17/20 | |
| 9,123,160 B1 * | 9/2015 | Hollis | G06T 17/05 | |
| 9,196,079 B2 * | 11/2015 | Yang | G06T 15/08 | |
| 9,465,891 B1 * | 10/2016 | Kagan | G06F 17/30994 | |
| 9,607,353 B2 * | 3/2017 | Li | G06T 1/20 | |
| 9,754,409 B2 * | 9/2017 | Soulard | G06T 17/205 | |
| 9,779,528 B2 * | 10/2017 | Cohen | G06T 11/60 | |
| 2003/0117405 A1 * | 6/2003 | Hubrecht | G06T 17/00 | 345/543 |
| 2004/0257363 A1 * | 12/2004 | Veach | G06T 17/20 | 345/423 |
| 2005/0078116 A1 * | 4/2005 | Sloan | G06T 15/50 | 345/502 |
| 2006/0109267 A1 * | 5/2006 | Rybacki | G06T 17/05 | 345/423 |
| 2006/0170693 A1 * | 8/2006 | Bethune | G06T 3/40 | 345/568 |
| 2007/0247458 A1 * | 10/2007 | Surazhsky | G06T 17/20 | 345/423 |
| 2010/0164954 A1 * | 7/2010 | Sathe | G06T 17/20 | 345/423 |
| 2010/0164955 A1 * | 7/2010 | Sathe | G06T 17/20 | 345/423 |
| 2010/0253683 A1 * | 10/2010 | Munkberg | G06T 17/20 | 345/423 |
| 2011/0057931 A1 * | 3/2011 | Goel | G06T 17/20 | 345/423 |
| 2011/0058735 A1 * | 3/2011 | Tastl | H04N 1/6016 | 382/162 |
| 2011/0063294 A1 * | 3/2011 | Brown | G06T 15/005 | 345/423 |
| 2011/0080405 A1 * | 4/2011 | Moreton | G06T 17/20 | 345/423 |
| 2011/0080416 A1 * | 4/2011 | Duluk, Jr. | G06T 1/20 | 345/506 |
| 2011/0085736 A1 * | 4/2011 | Dmitriev | G06T 17/20 | 382/199 |
| 2011/0091118 A1 * | 4/2011 | Ahn | G06T 9/001 | 382/232 |
| 2011/0128285 A1 * | 6/2011 | Gong | G06T 17/20 | 345/423 |
| 2011/0193859 A1 * | 8/2011 | Kim | G06T 17/005 | 345/419 |
| 2011/0285724 A1 * | 11/2011 | Kilgard | G06T 15/005 | 345/443 |
| 2011/0316854 A1 * | 12/2011 | Vandrovec | G06T 17/005 | 345/420 |
| 2012/0169715 A1 * | 7/2012 | Noh | G06T 17/05 | 345/419 |
| 2012/0182298 A1 * | 7/2012 | Sun | G06T 17/005 | 345/423 |
| 2013/0131978 A1 * | 5/2013 | Han | G01C 21/3638 | 701/436 |
| 2013/0155080 A1 * | 6/2013 | Nordlund | G06T 15/005 | 345/522 |
| 2013/0169629 A1 * | 7/2013 | Shin | G06T 15/04 | 345/419 |
| 2013/0169636 A1 * | 7/2013 | Yang | G06T 15/08 | 345/423 |
| 2013/0325903 A1 * | 12/2013 | Rohlf | G06F 17/30241 | 707/797 |
| 2013/0342535 A1 * | 12/2013 | Sylvan | G06T 15/005 | 345/426 |
| 2014/0063012 A1 * | 3/2014 | Madani | G06T 17/20 | 345/423 |
| 2014/0063013 A1 * | 3/2014 | Goel | G06T 15/005 | 345/423 |
| 2014/0063014 A1 * | 3/2014 | Goel | G06T 1/60 | 345/423 |
| 2014/0092091 A1 * | 4/2014 | Li | G06T 17/20 | 345/423 |
| 2014/0104197 A1 * | 4/2014 | Khosravy | G01C 21/3664 | 345/173 |
| 2014/0111513 A1 * | 4/2014 | Ceylan | G06T 17/20 | 345/423 |
| 2014/0133708 A1 * | 5/2014 | Lecuelle | G06T 17/05 | 382/108 |
| 2014/0184598 A1 * | 7/2014 | Quilot | G06T 17/205 | 345/423 |
| 2014/0192051 A1 * | 7/2014 | Meiri | G06T 15/005 | 345/423 |
| 2014/0210819 A1 * | 7/2014 | Mei | G06T 15/005 | 345/423 |
| 2015/0054714 A1 * | 2/2015 | Haubner | G09B 9/00 | 345/1.3 |
| 2015/0130797 A1 * | 5/2015 | Chen | G06K 9/00637 | 345/420 |
| 2015/0145863 A1 * | 5/2015 | Buron | G06T 15/10 | 345/423 |
| 2015/0363665 A1 * | 12/2015 | Szasz | G06K 9/52 | 382/203 |
| 2016/0078655 A1 * | 3/2016 | Cohen | G06K 9/18 | 345/468 |
| 2016/0093088 A1 * | 3/2016 | Shreiner | G06T 15/005 | 345/423 |
| 2016/0358373 A1 * | 12/2016 | Fenney | G06T 17/20 | |
| 2016/0358375 A1 * | 12/2016 | Lacey | G06T 17/20 | |
| 2017/0039765 A1 * | 2/2017 | Zhou | G06T 19/006 | |
| 2017/0091993 A1 * | 3/2017 | Andrew | G06F 3/04812 | |
| 2017/0109927 A1 * | 4/2017 | Patel | G06T 17/205 | |
| 2017/0132836 A1 * | 5/2017 | Iverson | G06T 15/04 | |
| 2017/0132837 A1 * | 5/2017 | Iverson | G06T 17/10 | |
| 2017/0200301 A1 * | 7/2017 | Boisse et al. | A63F 13/525 | |
| 2017/0329801 A1 * | 11/2017 | Rohlf | G06F 17/30241 | |

OTHER PUBLICATIONS

Ju et al, "Geomorphing Crack Elimination Technique for Improving Terrain Rendering Quality", Agency for Defense Development, Oct. 2003, vol. 30, No. 2, 5 pages.
Korean Office Action dated Mar. 24, 2015 corresponding to Korean Application No. 10-2014-0014101.
Korean Notice of Allowance dated Aug. 31, 2015 corresponding to Korean Application No. 10-2014-0014101.

(56) References Cited

OTHER PUBLICATIONS

International Search Report dated Nov. 5, 2014 corresponding to International Application PCT/KR2014/002497.

* cited by examiner

[fig. 1]
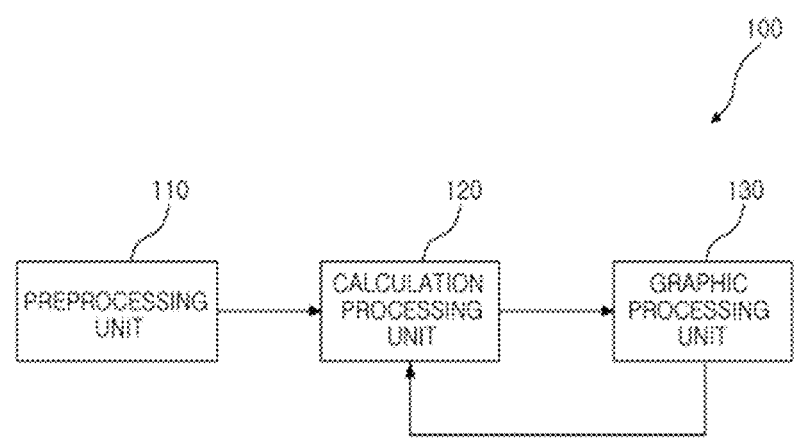

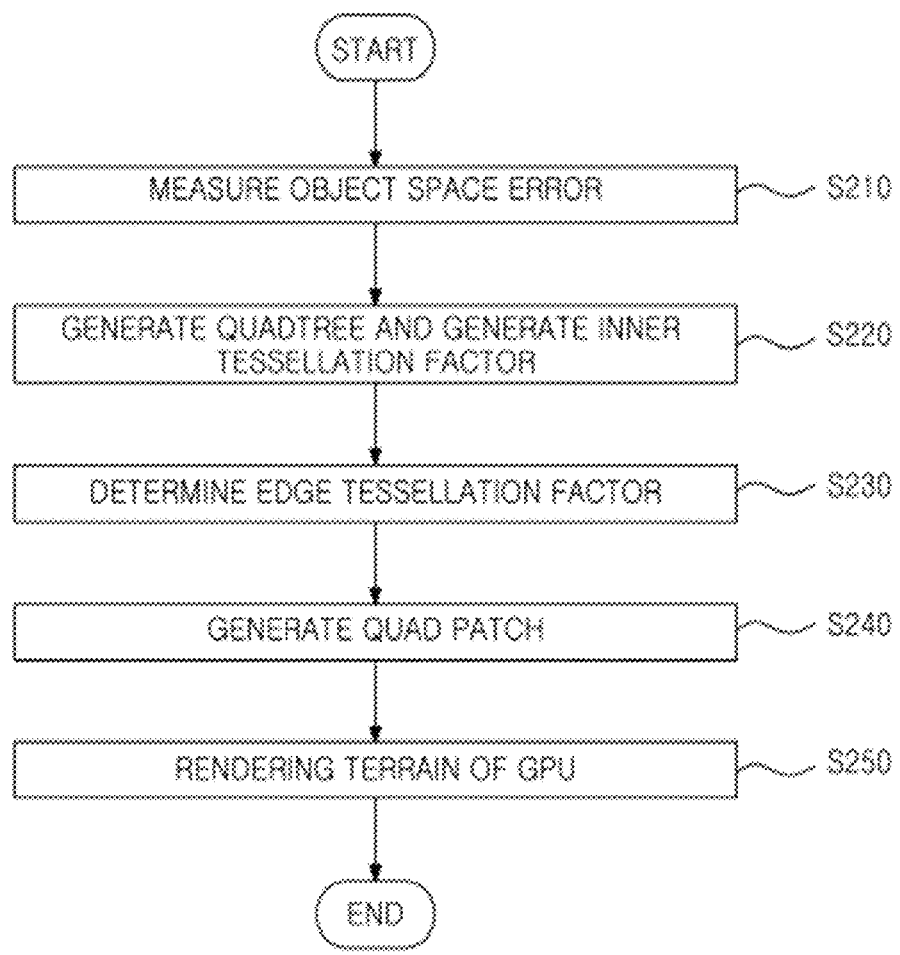

[fig. 3a]
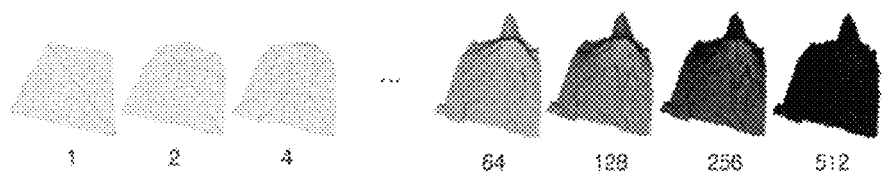

[fig. 3b]
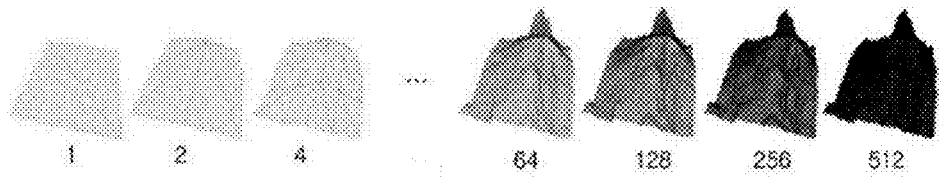

[fig. 4]

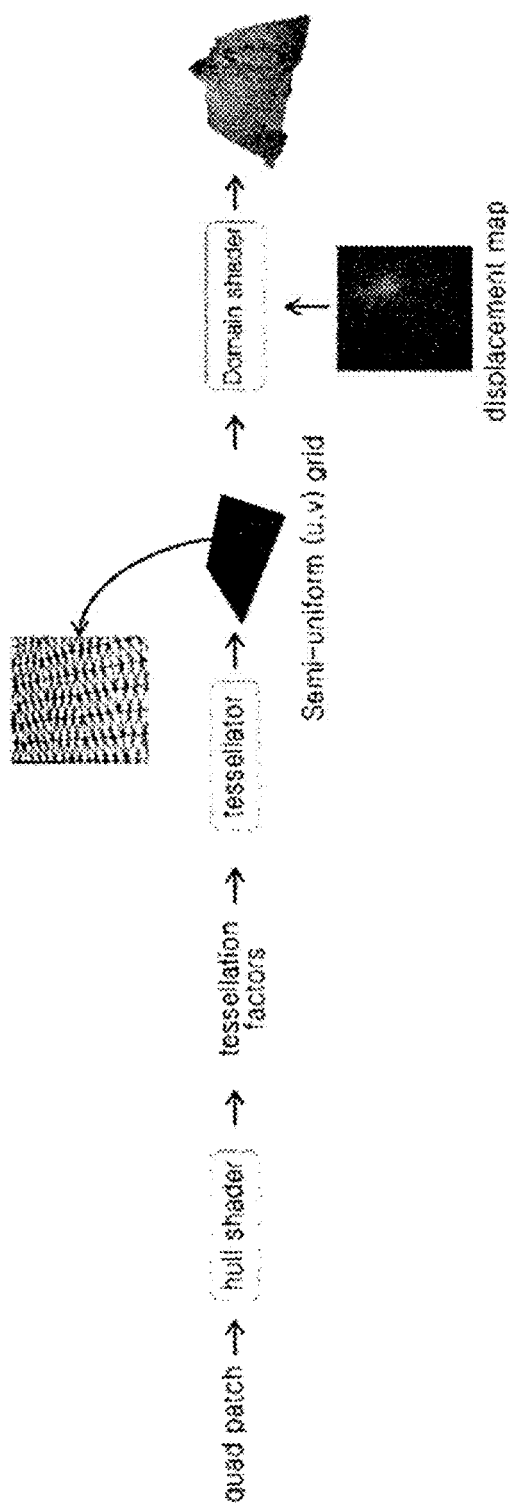
[fig. 5]

[fig. 6a]
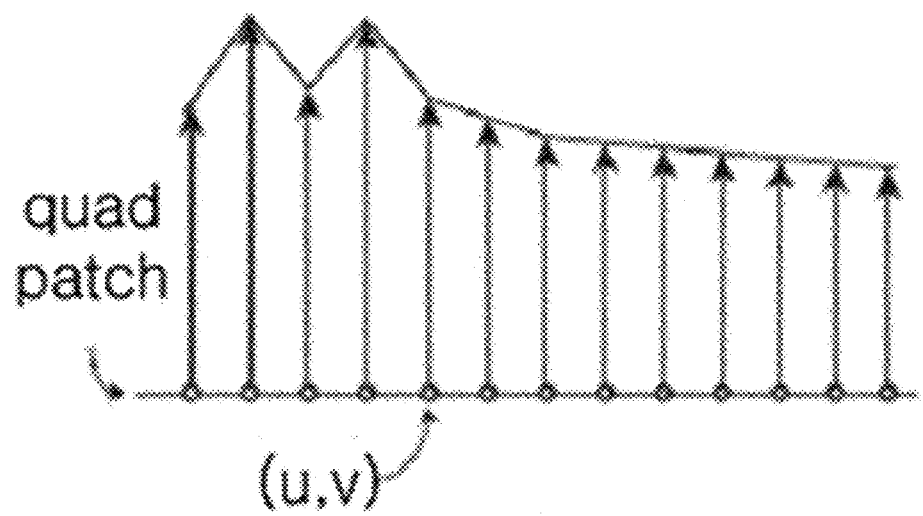

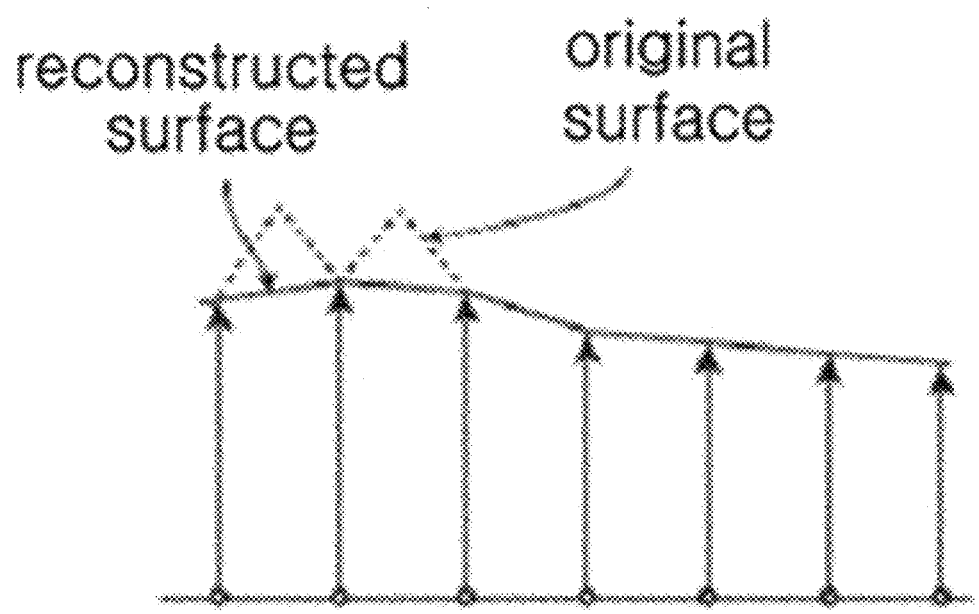
[fig. 6b]

[fig. 6c]
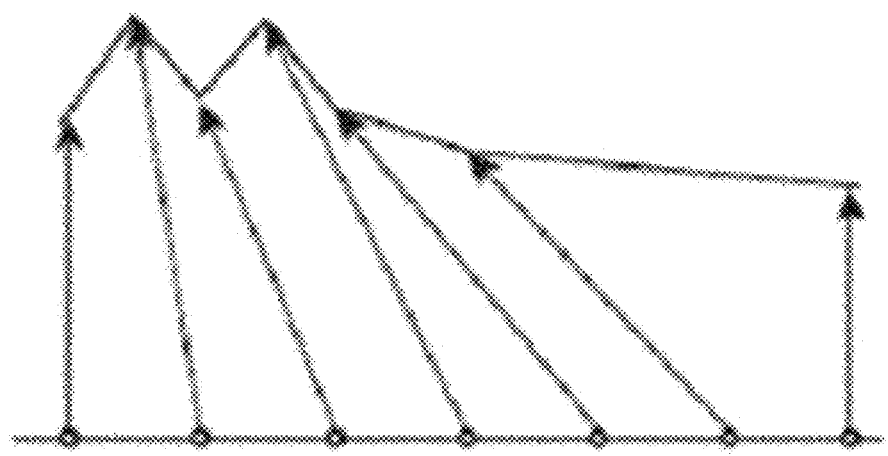

[fig. 7a]
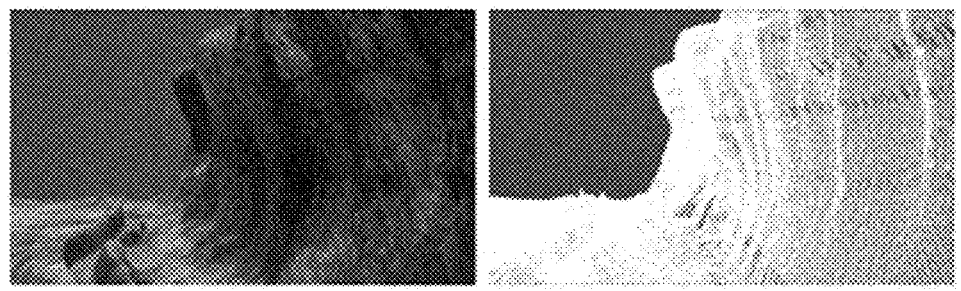

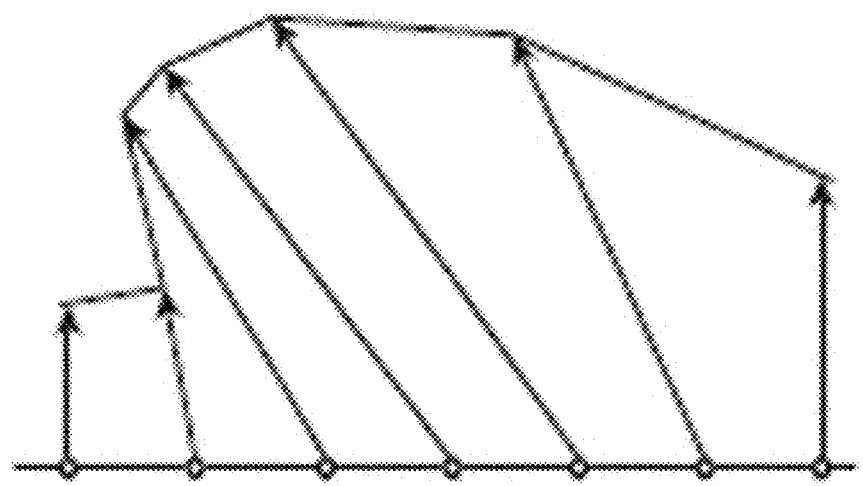
[fig. 7b]

[fig. 8a]
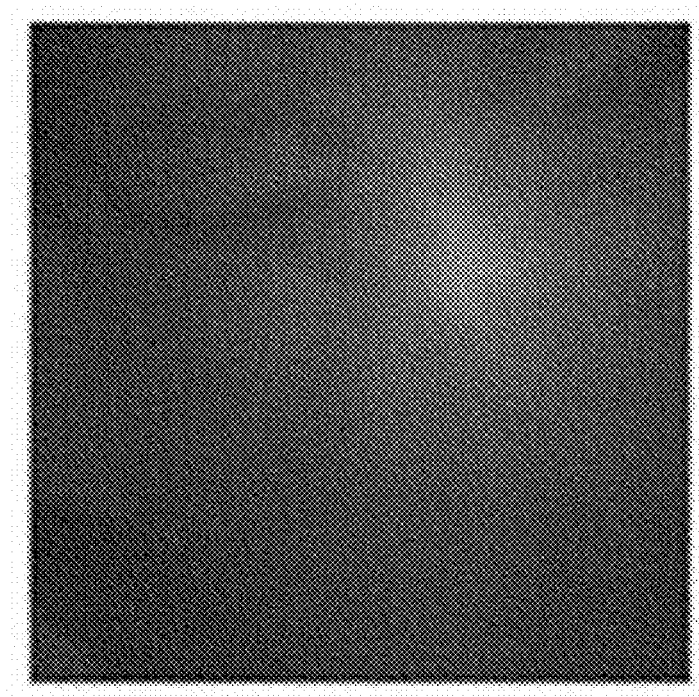

[fig. 8b]
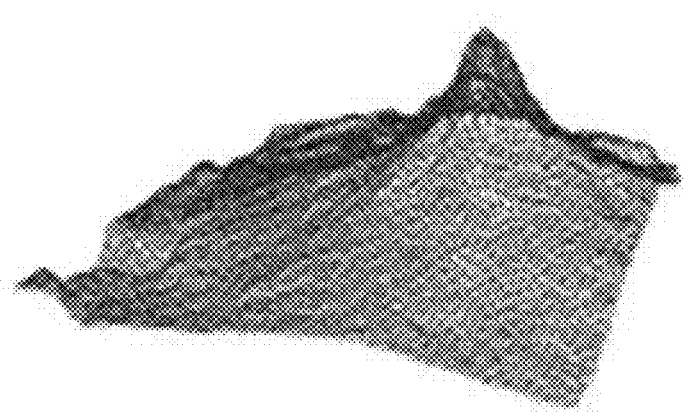

[fig. 8c]
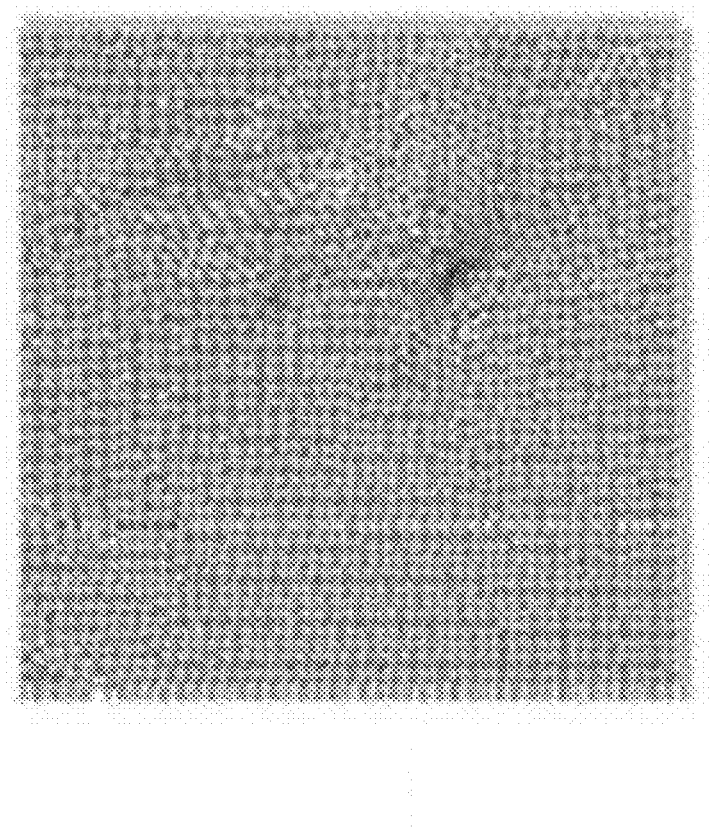

[fig. 8d]
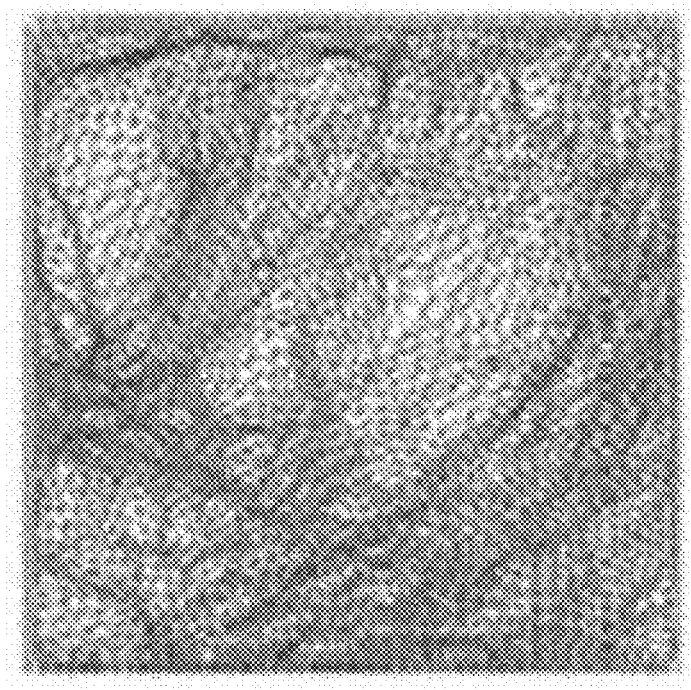

[fig. 8e]
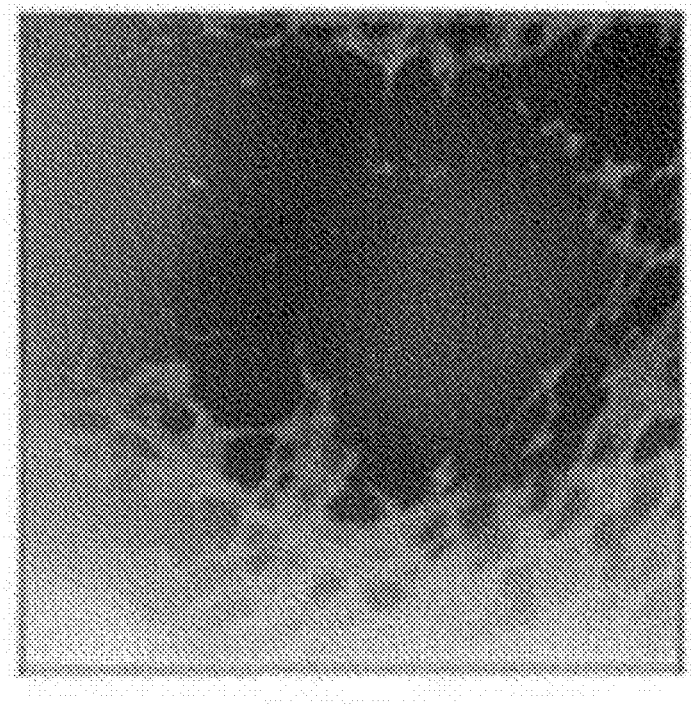

[fig. 9]

| Algorithm 1: Node merging |
|---|
| N = bottom_up_search_for_parent(quadtree) <br> while N do <br>     if N's children are all leaf nodes then <br>         if LOD 64 is sufficient for N then <br>             delete N's children <br>         end <br>     end <br>     N = bottom_up_search_for_parent(quadtree) <br> end |

[fig. 10]

Algorithm 2: Node splitting

```
N = depth_first_search(quadtree)
while N do
    if N is a leaf node then
        if LOD 64 is insufficient for N then
        |   split N into four children
        end
    end
    N = depth_first_search(quadtree)
end
```

METHOD FOR RENDERING TERRAIN

CROSS REFERENCE TO RELATED APPLICATION

This application claims the priority of Korean Patent Application No. 10-2014-0014101, filed on Feb. 7, 2014 in the KIPO (Korean Intellectual Property Office). Further, this application is the National Phase application of International Application No. PCT/KR2014/002497 filed Mar. 25, 2014, which designates the United States and was published in Korean.

BACKGROUND

1. Technical Field

The present invention relates to a method for rendering a terrain, and more particularly, to a method for rendering a multi-resolution terrain using GPU tessellation.

2. Description of the Related Art

Terrain rendering is used in various fields including a geographic information system (GIS), a flight simulation, an interactive computer game, and the like. As a method for the terrain rendering, a triangular mesh or other polygonal models are commonly used.

Since the size of a capacity of geographic information data required for the terrain rendering is very large, from hundreds of GB to tens of TB, techniques capable of rendering the geographic information data by simplifying a mesh based on a viewpoint of a user and a curve of a surface need to be applied in order to render the geographic information data in real time. As a related prior document, Korean Patent Registration No. 10-0726031 is provided.

The terrain rendering techniques can be generally classified into two groups. A first group is a group using a regular hierarchical structure and the a most representative example is hierarchies of right triangles (HRT). A second group is triangulated irregular networks (TINs). Since the TINs can unevenly sample a terrain, the number of unnecessary triangles can be minimized, but a complicated calculation and a larger storage space are required to achieve multi-resolution.

Therefore, recently, a research into the terrain rendering technique for efficiently achieving the multi-resolution has been demanded.

SUMMARY

An aspect of the present invention provides a method for rendering a terrain, which can achieve multi-resolution while solving a crack problem According to an aspect of the present invention, there is provided a method for rendering a terrain using GPU tessellation, including: generating a quad patch to which an inner tessellation factor and an edge tessellation factor are allocated by using a quadtree including a parent node and child nodes; generating a base mesh b using the quad patch; and restoring a terrain by applying a displacement map to the base mesh.

According to another aspect of the present invention, there is provided an apparatus for rendering a terrain using GPU tessellation, including: a calculation processing unit generating a quad patch to which an inner tessellation factor and an edge tessellation factor are allocated by using a quadtree including a parent node and child nodes; and a graphic processing unit generating a base mesh by using the quad patch and restoring a terrain by applying a displacement map to the base mesh.

Additional aspects and advantages of the present invention will be set forth in part in the description which follows, and in part will be obvious from the description, or may be learned by practice of the invention.

BRIEF DESCRIPTION OF THE DRAWINGS

FIG. 1 is a block diagram of an apparatus for rendering a terrain according to an embodiment of the present invention.

FIG. 2 is a flowchart of a method for rendering a terrain according to an embodiment of the present invention.

FIG. 3a illustrates a height-mapped terrain according to the embodiment of the present invention.

FIG. 3b illustrates a feature preserving geometry image (FGI)-mapped terrain according to the embodiment of the present invention.

FIG. 4 is a diagram for describing generation of quadtree for each tile in the method for rendering a terrain according to the embodiment of the present invention.

FIG. 5 illustrates a terrain rendering pipeline in a graphic processing unit (GPU) in the method for rendering a terrain according to the embodiment of the present invention.

FIG. 6a illustrates a result of restoring the terrain by using the height map with an sufficient resolution according to the embodiment of the present invention.

FIG. 6b illustrates a state in which the tessellation factor decreases to have the insufficient resolution according to the embodiment of the present invention.

FIG. 6c illustrates a state in which vertices are positioned at a location where a variation rate is high by using the FGI to restore the terrain with the insufficient resolution according to the embodiment of the present invention.

FIG. 7a illustrates the overhang geometry according to the embodiment of the present invention.

FIG. 7b illustrates an example of restoring FIG. 7a by using the FGI according to the embodiment of the present invention.

FIG. 8a illustrates the height map according to the embodiment of the present invention.

FIG. 8b illustrates a regular grid mesh according to the embodiment of the present invention.

FIG. 8c illustrates a result in which the modification is repeated one time according to the embodiment of the present invention.

FIG. 8d illustrates a result in which the modification is repeated several times (approximately 500 times) according to the embodiment of the present invention.

FIG. 8e illustrates the FGI finally acquired by storing a location value in texture by sampling the parameterization result according to the embodiment of the present invention.

FIG. 9 illustrates a node merging algorithm in the method for rendering a terrain according to the embodiment of the present invention.

FIG. 10 illustrates a node splitting algorithm in the method for rendering a terrain according to the embodiment of the present invention.

DESCRIPTION OF NUMERALS

100: Terrain rendering apparatus
110: Preprocessing unit

120: Calculation processing unit
130: Graphic processing unit

DETAILED DESCRIPTION

Hereinafter, a method and an apparatus for rendering a terrain according to embodiments of the present invention will be described with reference to the drawings.

Singular expressions used in the present specification include plural expressions unless they have definitely opposite meanings in the context. In the present specification, a term such as "comprising" or "including" should not be interpreted as necessarily including all various components or various steps disclosed in the specification, and it should be interpreted that some component or some steps among them may not be included or additional components or steps may be further included.

FIG. 1 is a block diagram of an apparatus for rendering a terrain according to an embodiment of the present invention.

As illustrated in FIG. 1, the terrain rendering apparatus 100 may include a preprocessing unit 110, a calculation processing unit 120, and a graphic processing unit 130.

The preprocessor 110 may perform a preprocessing procedure before performing terrain rendering. For example, the preprocessing unit 110 may measure object space errors and parameterize a terrain mesh to generate a geometry image. The object space errors and the geometry image will be described below.

The calculation processing unit 120 may calculate and generate various data for performing the terrain rendering in the graphic processing unit 130. For example, the calculation processing unit 120 may generate quadtree and determine an inner tessellation factor by using the measured object space errors. In addition, the calculation processing unit 120 may determine an edge tessellation factor by using the inner tessellation factor.

The graphic processing unit 130 may perform the terrain rendering by using data processed by the calculation processing unit 120. The graphic processing unit 130 may be a graphic processing unit (GPU). For example, the graphic processing unit 130 may restore the terrain by using quad patch information generated at the calculation processing unit. One node among a plurality of nodes included in the quadtree may become a quad patch.

The total number of tessellation factors which need to be considered per quad patch is 6. These 6 tessellation factors include 4 tessellation factors for each edge and 2 inner tessellation factors corresponding to horizontal and vertical splitting numbers therein.

Operations performed by the calculation processing unit 120 and the graphic processing unit 130 are performed every frame unlike the preprocessing unit 110.

FIG. 2 is a flowchart of a method for rendering a terrain according to an embodiment of the present invention.

The preprocessing unit 110 may measure the object space errors (S210). The object space errors may be used to acquire a screen-space error. A value indicating that the object space errors correspond to how many pixels on a screen is the screen-space error. The object space errors may be measured by the following method.

FIG. 3a to FIG. 3b illustrates a hierarchical structure of a mesh used to calculate an object space error in the method for rendering a terrain according to the embodiment of the present invention. FIG. 3a illustrates a height-mapped terrain and FIG. 3b illustrates a feature preserving geometry image (FGI)-mapped terrain. The height map may be a map generated by only vertically raising each vertex of a mesh structure according to a height on a 3D coordinate. The FGI may be a map generated by raising each vertex of the mesh structure according to a vector considering a feature of the terrain on the 3D coordinate.

Hereinafter, in the embodiment, a case in which a displacement map has a resolution of a maximum of 513×513 will be described as an example. In this case, the maximum resolution which may be processed by the graphic processing unit 130 is 65×65 due to a hardware limit.

In respect to the object space errors, in a preprocessing step, a height in each mesh vertex is compared with a height of the mesh vertex at 512 levels while sequentially decreasing the resolution of the terrain to calculate a difference between both heights and finally, a largest value is determined as the object space error at each level, as shown in FIG. 3. That is, the object space error of the terrain having the resolution of 513×513 is split into a total of 8×8 blocks and a largest difference in height value in the region becomes the object space error for each level. In this case, when the terrain has the maximum resolution of 513×513, the largest difference in height value in the region is stored by splitting the resolution by halves and a maximum value (a maximum difference in height value) in the region is stored while decreasing from 513×513 to 257×257, . . . , 3×3, 2×2. A mesh having $(2^n+1) \times (2^n+1)$ vertexes is referred to as $2^n$ level.

The screen-space error is a value indicating that the object space error corresponds to how many pixels when the object space error is projected to a screen space (an actual location shown on a monitor).

The calculation processing unit 120 may generate the quadtree and determine an inner tessellation factor by using the screen-space error (S220). Since each node has the inner tessellation factor corresponding to a multiple of 2 and the maximum resolution which may be processed by the graphic processing unit 130 is 65×65, the inner tessellation factor may have a value of a maximum of 64.

When the quadtree is configured first, the configuration of the quadtree starts from a most sparse level (Level 1). In respect to the object-space error region of each 8×8, the corresponding error is positioned at a point closest to the viewpoint in the region and projected to the screen-space to obtain the screen-space error value. When the screen-space error is smaller than a predetermined threshold, the inner tessellation factor of the corresponding tile is set to 1.

However, when the screen-space error is larger than the threshold, while the level is increased one by one, the level is repeatedly increased until the error value becomes the threshold or more. When the inner tessellation factor of the tile is larger than 64, since the error exceeds a limit of the GPU, the tile is split into 4 patches (that is, child nodes are generated) and the error value depending on the level is measured with respect to each of the split patches. When the maximum resolution of the terrain is 513×513, a depth of the quadtree is limited to 4.

In addition, in the following embodiment, it is assumed and described that the inner tessellation factor corresponding to the horizontal splitting number and the inner tessellation factor corresponding to the vertical splitting number have the same value.

When the inner tessellation factor is determined with respect to all child nodes (leaf nodes), the calculation processing unit 120 may calculate an edge tessellation factor (S230).

Since the number of triangles generated through tessellation is maximally reduced, the calculation processing unit 120 may determine a minimum edge tessellation factor value which satisfies the threshold. The minimum edge tessellation factor value is determined by breadth-first circulating the quadtree.

Figure 4:
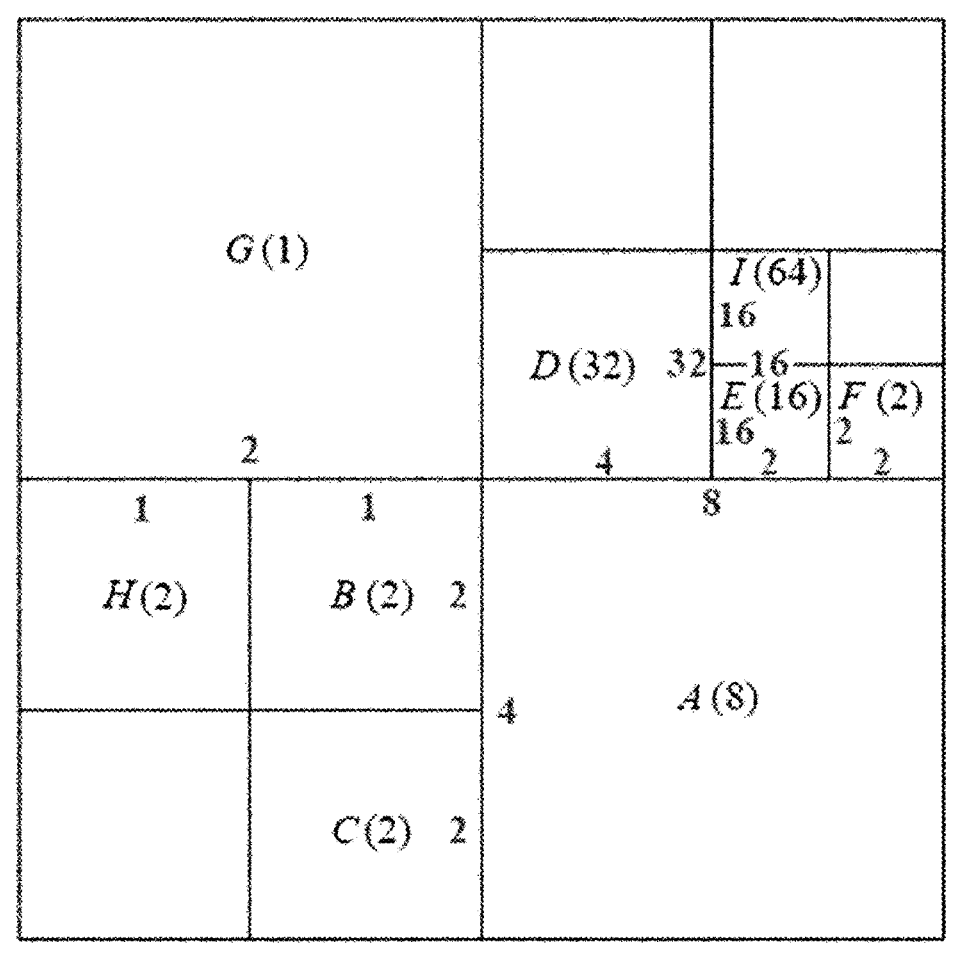

FIG. 4 is a diagram for describing generation of quadtree for each tile in the method for rendering a terrain according to an embodiment of the present invention.

In FIG. 4, node A having inner tessellation factor 8 shares an edge with nodes B and C having the smaller inner tessellation factor. The nods B and C have equal inner tessellation factor 2 and when the inner tessellation factor 2 is increased at the same ratio for comparison with the node A, the inner tessellation factor becomes 4. That is, when the edge lengths of the nodes B and C are increased by two times in order to unify edge lengths of the nodes B and C to an edge length of the node A, the inner tessellation factors of the nodes B and C become 4. Then, a number which is a smallest size in a region between 4 and 8 and satisfies two following conditions is determined as the edge tessellation factor at the corresponding edge.

1) An extracted number needs to be the multiple of 2.
2) The number needs to be a value which is divided according to an edge length ratio and a size ratio to have a natural number.

Since a minimum number which satisfies the conditions is 4, the calculation processing unit 120 sets a left edge tessellation factor on a left of the node A to 4 and divides 4 by halves and sets the edge tessellation factor of 2 to each of the nodes B and C according to the edge length ratio.

In regarding an upper edge of the node A, the node A shares the edge with nodes D, E, and F having different sizes. A largest value among inner tessellation factor values which are increased according to the length ratio in the nodes D, E, and F is 64. In addition, since the inner tessellation factor of the node A is 8, the edge tessellation factor is in the range of [8 to 64]. Herein, the value which satisfies two conditions described above is 8. Therefore, the upper edge tessellation factor of the node A is set to 8 and while 8 is divided according to the length ratio in the nodes D, E, and F, the edge tessellation factors of the nodes D, E, and F have values of 4, 2, and 2, respectively.

In regarding a lower edge of node G, nodes B and H smaller than node G are positioned and a value of the node G is 1 and a value depending on a length ratio of the nodes B and H is 4. Therefore, the edge tessellation factor is in the range of 1 to 4. Herein, since 1 may not be divided according to the length ratio and 1 may not satisfy condition #2, 2 is determined as a lower edge tessellation factor of the node G and at the same time 1 is set to each of the nodes H and B. The smaller value of inner tessellation factors of nodes E and I having the same size is 16, and as a result, the value is determined as the edge tessellation factors of the nodes E and I.

When the resolution of the tile is determined by the aforementioned method, the multi-resolution may be provided without a crack. The process is similarly applied even to the edge shared by two tiles. To this end, before the edge tessellation factor is calculated, quadtree data and the inner tessellation factor values for all tiles in view frustum need to be determined.

The calculation processing unit 120 may generate the quad patch illustrated in FIG. 4 by using the quadtree, the generated inner tessellation factor and edge tessellation factor (S240).

Information on the quad patch may be input into the graphic processing unit 130. The graphic processing unit 130 may perform the terrain rendering by using the input quad patch information and a tessellator (S250).

FIG. 5 illustrates a terrain rendering pipeline in a graphic processing unit (GPU) 130 in the method for rendering a terrain according to the embodiment of the present invention.

First, the quad patch information is used as an input of the graphic processing unit 130. The quad patch information is information used for make a flat base mesh called semi-uniform (u,v) grid. The terrain is restored by moving each point of the base mesh on a 3D coordinate system by using a height value (at the time of applying the height map to the displacement map) or a vector value (at the time of applying the FGI to the displacement map) in domain shader later.

The hull shader serves to transfer the tessellation factor determined by the calculation processing unit 120 to the tessellator. Tessellator is a part that actually generates semi-uniform (u,v) grid which is a patch having a resolution matching with the input tessellation factor. The generated grid restores a final terrain by moving each point by using information on the terrain referred to the displacement map to perform the rendering in a domain shader step. The displacement map may include the height map, the geometry image, and the like. An example of the geometry image includes the feature preserving geometry image (FGI) considering a variation rate.

FIG. 6a to FIG. 6c illustrates a result of restoring a terrain by using a height map and a feature preserving geometry image (FGI) in the method for rendering a terrain according to the embodiment of the present invention.

FIG. 6a illustrates a result of restoring the terrain by using the height map with an sufficient resolution, FIG. 6b illustrates a state in which the tessellation factor decreases to have the insufficient resolution, and FIG. 6c illustrates a state in which vertices are positioned at a location where a variation rate is high by using the FGI to restore the terrain with the insufficient resolution.

When a technology that restores the terrain by using the height map cannot have the sufficient resolution, the terrain in which the variation rate is high cannot be normally restored. However, when the FGI is used, more apexes are positioned at the point where the variation rate is high to more excellently restore the terrain with a lower resolution.

FIG. 7a to FIG. 7b illustrates an example of restoring the overhang geometry by using the FGI.

FIG. 7a illustrates the overhang geometry and FIG. 7b illustrates an example of restoring FIG. 7a by using the FGI.

As illustrated in FIG. 7, when the height map is used, the overhang geometry illustrated in FIG. 7a may not be normally restored, but the overhang geometry illustrated in FIG. 7a may also be normally restored by using the FGI.

The FGI may be generated by using Equation 1 given below.

$$w_v = \alpha \frac{C_v}{\Sigma C} + (1-\alpha)\frac{S_v A_v}{\Sigma SA} \quad \text{[Equation 1]}$$

$$C_v = \sum_{e \ni v} \Box 2 \|e\| \sin\frac{\theta_e}{2}$$

$$S_v = \begin{cases} 2 & \text{if } v \in \text{ridges} \\ 1 & \text{otherwise} \end{cases}$$

$$A_v = \sum_{t \ni v} \Box A_t$$

Where, $C_v$ represents a variable to measure a bending degree, $S_v$ represents a value given to increase weight with respect to a point included in ridge, and $A_v$ represents the sum of triangular area sharing a vertex v. Further, α represents a user-define parameter and $\theta_e$ represents an external dihedral angle of edge e connected to v. The weight may be construed as the variation rate, the point where the variation rate is high has a large weight, and a point where the variation rate is small has a small weight.

FIG. 8a to FIG. 8e is a diagram illustrating a process of generating the FGI in the method for rendering a terrain according to the embodiment of the present invention.

FIG. 8a illustrates the height map and FIG. 8b illustrates a regular grid mesh. The vertex and weight measured by Equation 1 given above are stored and the corresponding mesh may be parameterized.

As shown in FIG. 8b, the parameterization result may be modified so that a point where the weight is large has a larger region and a point where the weight is small has a smaller region by using a Voronoi region. The parameterization result may be adjusted to have a more accurate value through more repetition of the modification. FIG. 8c illustrates a result in which the modification is repeated one time and FIG. 8d illustrates a result in which the modification is repeated several times (approximately 500 times). In addition, FIG. 8e illustrates the FGI finally acquired by storing a location value in texture by sampling the parameterization result.

Meanwhile, when the FGI is used, the crack may be prevented by performing a Zippering process in a preprocessing step.

Since the FGI is acquired by texturizing a value acquired through sampling after parameterization, a minute value difference occurs in a boundary region. Even though two tile type textures adjacent to each other refer to the same region in the boundary, the minute value difference occurs, and as a result, two textures do not have the completely same value, thereby bringing about the crack. A method which adjusts the same value by selecting one of two textures having boundaries adjacent to each other and forcibly copying data in the corresponding boundary region to the other texture in order to prevent the crack is referred to as Zippering.

Meanwhile, according to an embodiment of the present invention, after the quadtree of the tile is configured one time as described above, the quadtree may be updated in real time as the position of a view is changed. Each of the quadtrees used in the previous frame is updated through merging and splitting processes to configure a multi-resolution tile by using calculation resources still less than those when configuring the quadtree first.

FIG. 9 illustrates a node merging algorithm in the method for rendering a terrain according to the embodiment of the present invention.

When the view is changed, the calculation processing unit 120 first performs merging. In the merging, the screen-space error is measured by using tessellation factor 64 with respect to parent nodes having four child nodes (leaf nodes) by using bottom-up and breadth-first methods and when the error is the threshold or less, merging of removing the lead node is performed and otherwise, calculation of a method for just leaving the leaf node is performed.

In more detail, first, the merging is performed with respect to a node which need not be densely expressed any longer. The screen space error of a current node is measured, and when it is determined that the screen space error has the sufficient resolution (the error is the threshold or less), the screen space error is measured even in other children having the same parent node thereas. Even here, when the error is the threshold or less, last, the screen space error is again measured even in the parent node once again. Even here, when it is determined that the error has the sufficient resolution, since four child nodes need not be maintained, four child nodes are removed and only the parent node is left. Such a process is the merging.

After the merging is performed, the splitting is performed.

FIG. 10 illustrates a node splitting algorithm in the method for rendering a terrain according to the embodiment of the present invention.

The screen space error is measured with tessellation factor 64 with respect to each of the child nodes (leaf nodes) to check whether the screen space error is the error threshold or less. When the error is more than the threshold, the splitting of generating four leaf nodes is performed.

In more detail, in the splitting, it is determined whether the measured screen space error is the threshold or less by considering a location of Camera which varies while circulating nodes at a last terminal. When the error is larger than the threshold, since the error may not have the sufficient resolution, the node is additionally split to generate four child nodes. Such a process is the splitting.

The merging and the splitting may be performed while satisfying a multi-resolution scheme given below.
1. The depth of the quadtree is limited to 4 and the quadtree is configured by minimally using resources of a CPU.
2. The quadtree is completely independently processed in the GPU pipeline from each other, but the entire terrain generated through the quadtree satisfies 'geometric continuation'.
3. Since the quadtree has a regular structure, the rendering is sufficiently possible in spite of sending only index information of one node instead of transmitting four corner points to the GPU pipeline.

The terrain rendering method according to the embodiment of the present invention can solve the crack problem while achieving the multi-resolution.

Further, according to the embodiment of the present invention, while the terrain can be rendered rapidly by using the tessellator of the GPU, an adaptive resolution can be determined according to the curve information of the terrain and the location of the camera to minimize rendering resources which are unnecessarily consumed.

In addition, since overall performance is enhanced by efficiently and simply managing tiles required to render the terrain through the quadtree, a large-capacity terrain can be rendered in real time.

Further, the terrain rendering method may be implemented in a program command form executable by various computer means and recorded in a computer readable recording medium. In this case, the computer readable recording medium may include one or a combination of a program command, a data file, and a data structure. Meanwhile, the program command recorded in the recording medium may be specially designed and configured for the present invention, or may be publicly known to and used by those skilled in the computer software field.

The computer-readable recording medium includes magnetic media such as a hard disk, a floppy disk, and a magnetic tape, optical media such as a CD-ROM and a DVD, a magneto-optical media such as a floptical disk, and a hardware device which is specifically configured to store and examples of the program command such as a ROM, a RAM, and a flash memory.

Meanwhile, the recording medium may be transmission media such as an optical or metallic wire, a waveguide, and the like including a carrier transmitting a signal designating a program command, a data structure, and the like.

Further, the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available.

In the method and apparatus for rendering the terrain described as above, the constitutions and methods of the described embodiments cannot be limitatively applied, but all or some of the respective embodiments may be selectively combined and configured so that various modifications of the embodiments can be made.

According to an aspect of the present invention, a method and an apparatus for rendering a terrain can solve a crack problem while achieving multi-resolution.

According to another aspect of the present invention, while the terrain can be rendered at a high speed by using a tessellator of a GPU, adaptive resolution can be determined according to curve information of the terrain and a location of a camera to thereby minimize rendering resources which are unnecessarily consumed.

According to yet another aspect of the present invention, since an entire terrain is managed through a simplified data structure called quadtree, even a large-capacity terrain can be managed only by small memory consumption and operations of determining the adaptive resolution and updating data can be very rapidly, efficiently, and simply processed, and as a result, overall performance is significantly enhanced.

What is claimed is:

1. A method for rendering a terrain using GPU tessellation, the method comprising;
    generating a quad patch to which an inner tessellation factor and an edge tessellation factor are allocated by using a quadtree including a parent node and child nodes;
    generating a base mesh b using the quad patch; and
    restoring a terrain by applying a displacement map to the base mesh,
    wherein the displacement map is a geometry image, and
    wherein the geometry image is determined by Equation 1 given below, $$w_v = \alpha \frac{C_v}{\Sigma C} + (1 - \alpha) \frac{S_v A_v}{\Sigma SA} \quad \text{[Equation 1]}$$

$$C_v = \sum_{e \ni v} 2 \|e\| \sin \frac{\theta_e}{2}$$

$$S_v = \begin{cases} 2 & \text{if } v \in \text{ridges} \\ 1 & \text{otherwise} \end{cases}$$

$$A_v = \sum_{t \ni v} A_t$$

(Where, $C_v$ represents a variable to measure a bending degree, $S_v$ represents a value given to increase weight with respect to a point included in ridge, and $A_v$ represents the sum of triangular area sharing a vertex v, Further, $\alpha$ represents a user-define parameter and $\theta_e$ represents an external dihedral angle of edge e connected to v).

2. The method for rendering a terrain of claim 1, wherein the edge tessellation factor is determined by using the inner tessellation factor of an adjacent quad patch.

3. The method for rendering a terrain of claim 2, wherein the edge tessellation factor is a multiple of 2 and is a minimum value among values which are divided according an edge length ratio and a size ratio to have a natural number.

4. The method for rendering a terrain of claim 3, wherein the generating of the quad patch comprises increasing the inner tessellation factor when a screen spacer error is a predetermined threshold or more in a specific node.

5. The method for rendering a terrain of claim 3, further comprising deleting the child node subordinate to the parent node when the screen space error of the parent node is the threshold or less as a location of a view is changed.

6. The method for rendering a terrain of claim 3, further comprising splitting the node into a plurality of nodes when the screen space error of the node is more than the threshold as the location of the view is changed.

7. An apparatus for rendering a terrain using GPU tessellation, the apparatus comprising;
    a calculation processing unit generating a quad patch to which an inner tessellation factor and an edge tessellation factor are allocated by using a quadtree including a parent node and child nodes; and
    a graphic processing unit generating a base mesh by using the quad patch and restoring a terrain by applying a displacement map to the base mesh,
    wherein the displacement map is a geometry image, and
    wherein the geometry image is determined by Equation 1 given below, $$w_v = \alpha \frac{C_v}{\Sigma C} + (1 - \alpha) \frac{S_v A_v}{\Sigma SA} \quad \text{[Equation 1]}$$

$$C_v = \sum_{e \ni v} 2 \|e\| \sin \frac{\theta_e}{2}$$

$$S_v = \begin{cases} 2 & \text{if } v \in \text{ridges} \\ 1 & \text{otherwise} \end{cases}$$

$$A_v = \sum_{t \ni v} A_t$$

(Where, $C_v$ represents a variable to measure a bending degree, $S_v$ represents a value given to increase weight with respect to a point included in ridge, and $A_v$ represents the sum of triangular area sharing a vertex v, Further, $\alpha$ represents a user-define parameter and $\theta_e$ represents an external dihedral angle of edge e connected to v).

8. The apparatus for rendering a terrain of claim 7, wherein the edge tessellation factor is determined by using the inner tessellation factor of an adjacent quad patch.

9. The apparatus for rendering a terrain of claim 8, wherein the edge tessellation factor is a multiple of 2 and is a minimum value among values which are divided according an edge length ratio and a size ratio to have a natural number.

10. The apparatus for rendering a terrain of claim 9, wherein the calculation processing unit increases the inner tessellation factor when a screen spacer error is a predetermined threshold or more in a specific node.

11. The apparatus for rendering a terrain of claim 10, wherein the calculation processing unit deletes the child node subordinate to the parent node when the screen space error of the parent node is the threshold or less as a location of a view is changed.

12. The apparatus for rendering a terrain of claim 10, wherein the calculation processing unit splits the node into a plurality of nodes when the screen space error of the node is more than the threshold as the location of the view is changed.

\* \* \* \* \*